US007100204B1

(12) United States Patent
Myllymaki et al.

(10) Patent No.: US 7,100,204 B1
(45) Date of Patent: Aug. 29, 2006

(54) SYSTEM AND METHOD FOR DETERMINING NETWORK USERS' PHYSICAL LOCATIONS

(75) Inventors: Jussi Petri Myllymaki, San Jose, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 10/118,491

(22) Filed: Apr. 5, 2002

(51) Int. Cl.
*G06F 12/14* (2006.01)
*H04L 9/32* (2006.01)

(52) U.S. Cl. .................. 726/22; 726/26; 455/456.1
(58) Field of Classification Search ................. 726/22, 726/26; 455/456.1
See application file for complete search history.

(56) References Cited

U.S. PATENT DOCUMENTS

| | | | |
|---|---|---|---|
| 4,799,156 A | 1/1989 | Shavit et al. ............... | 364/401 |
| 5,794,210 A | 8/1998 | Goldhaber et al. ........... | 705/14 |
| 5,845,149 A | 12/1998 | Husted et al. .............. | 395/829 |
| 5,855,008 A | 12/1998 | Goldhaber et al. ........... | 705/14 |
| 5,930,474 A | 7/1999 | Dunworth et al. ...... | 395/200.47 |
| 5,944,787 A | 8/1999 | Zoken ........................ | 709/206 |
| 5,987,440 A | 11/1999 | O'Neil et al. ................ | 705/44 |
| 6,115,709 A | 9/2000 | Gilmour et al. .............. | 707/9 |
| 6,131,119 A | 10/2000 | Fukui ........................ | 709/224 |
| 6,141,010 A | 10/2000 | Hoyle ........................ | 345/356 |
| 6,158,007 A | 12/2000 | Moreh et al. ................ | 713/201 |
| 6,173,404 B1 | 1/2001 | Colburn et al. ............. | 713/200 |
| 6,202,023 B1 | 3/2001 | Hancock et al. ............ | 701/201 |
| 6,920,616 B1 * | 7/2005 | Abbott et al. ............... | 715/744 |

(Continued)

FOREIGN PATENT DOCUMENTS

JP  2000315200  11/2000

(Continued)

OTHER PUBLICATIONS

"Quova Geopoint 4.0 Raises Bar for Geolocation Technology," Feb. 13, 2002.

(Continued)

*Primary Examiner*—Matthew Smithers
(74) *Attorney, Agent, or Firm*—Samuel A. Kassatly

(57) ABSTRACT

A computer program product is provided as a system for use with the Internet to determine the physical location of IP addresses. The system of the invention includes a locator broker and various databases. The locator broker is the intermediary between the locator sources that estimate the physical location of an IP address and the online sites requesting the physical location of the IP address. The locator broker aggregates and validates the results from its location queries of the locator sources then returns to the online site the most likely location for a given IP address. The locator broker also tracks the reliability of each locator source and thus targets its location queries to those services most likely to provide an accurate result. The locator broker digests location data from multiple geolocation services and presents a coherent view of the location data to the online site. The locator broker also provides value-added localization data to the online site based on the resulting location of the IP address including useful suggestions to the online site for tailoring data to the online user based on the user's physical location. The locator broker acts on a contract from the online site, which specifies the IP address for which a location is desired. The contract allows the online site to dictate the type of location desired (e.g., city, state), the accuracy desired, and the time frame in which the request must be satisfied. The locator broker bills the online site only when it satisfies the contract for time and accuracy.

24 Claims, 6 Drawing Sheets

U.S. PATENT DOCUMENTS

2002/0016831 A1* 2/2002 Peled et al. .................. 709/219
2003/0105864 A1* 6/2003 Mulligan et al. ........... 709/225
2005/0066282 A1* 3/2005 Abbott et al. ............... 715/740

FOREIGN PATENT DOCUMENTS

WO     WO 00/51359     8/2000

OTHER PUBLICATIONS

Chen et al., "A Web-based database system for conducting outcomes research via the Internet: The National Comprehensive Cancer Network system." Scientific and Statistical Database Management, 1998. Proceedings, Tenth International Conference.

* cited by examiner

SYSTEM AND METHOD FOR DETERMINING NETWORK USERS' PHYSICAL LOCATIONS

FIELD OF THE INVENTION

The present invention relates to the field of geolocation for determining the physical location of an Internet user. More specifically, this invention relates to a software system and associated method for managing the interface between companies wishing to know the location of a specific internet user and the user wishing to keep his/her location private. In addition, the software system and associated method create, maintain, and refine the mapping of hierarchical network addresses to hierarchical physical addresses.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Increasingly, users are shopping for products and other goods on the Internet, and companies are attempting to target their advertisements to users based on the users' geographic locations, in order to attract the users' attention to retail, service, or other businesses of potential interest to the users.

Companies allocate a significant budget each year on local advertising in the United States. The majority of this advertising is not directed to the WWW because of the difficulty in determining the physical locations of online users. Tracking an online user has been possible if the user's device for accessing the internet is equipped with a location tracking device such as a GPS device and, optionally, chooses to be tracked.

One conventional technique for obtaining an online user's location without these location tracking devices is through the use of "cookies," or data created by a Web server and is stored on a user's computer. Cookies provide a way for the Web site to keep track of a user's patterns and preferences and, with the cooperation of the Web browser, to store them on the user's own hard disk. However, cookies require the participation of the user, and unwilling online users can disable the use of cookies on their computers. In addition, online users could enter false data on forms that cookies rely upon.

Geolocation, that is the science of determining the location of a Web site user, is emerging as a new method for discovering the physical location of online users. Geolocation utilizes a common technique called "triangulation," which refers to the trigonometric operation for finding a position or location by means of bearings from two fixed points that are a known distance apart. Data is sent and received to and from a user's computer from multiple locations. The results are analyzed to triangulate the online user's physical location. As an example, geolocation has been used by companies having servers at various locations around the world that send data signals to Internet addresses, and then analyze the route and time these signals take to reach their destinations.

However, geolocation data provided by geolocation services is narrowly focused. Existing geolocation techniques result in a one-to-one mapping between a network address and a physical location. For instance, one can query the physical location of an Internet Protocol (IP) address and receive the precise physical location of that address, but little information is provided to indicate the physical location of "nearby" addresses as determined from a network point of view.

Geolocation services differ in the resolution of the location data they provide: some may provide merely a country name, while others may return state and city information. As a result, location-based services that use the information provided by geolocation services may face the difficult challenge of dealing with conflicting location data of multi-granularity.

Mobile devices equipped with a TCP/IP stack and a unique address can access the Internet. Additional technologies, such as Wireless Application Protocol (WAP) push, can further the networking capability of mobile devices. WAP is a standard for providing cellular phones, pagers and other handheld devices with secure access to e-mail and text-based Web pages.

As computers diminish in size and mobile devices become more powerful, the differences between them blur. Given the prevalence of mobile devices such as cell phones, the physical location of more and more online users can be determined by geolocation.

In addition to the growing mobile device market, a vast number of online users are equipped with stationary desktop computers. All these computers or devices have the potential to be "located". With the advent of the geolocation technology comes business opportunities, as well as serious privacy concerns. Online users, if asked, are always free to provide an online site with their geographical locations. The difficulty arises when online users wish to remain anonymous.

A location-based service such as a business wishing to target advertising to a geographic location needs high-quality, coherent location data. The online users need the ability to protect their privacy. Thus, there is need for efficiently providing location information without violating online users' right to privacy, which need has heretofore remained unsatisfied.

SUMMARY OF THE INVENTION

The present system and associated method of the present invention provide timely network users' location information and localized content, with a high degree of accuracy, without sacrificing the users' privacy. The system and method of the present invention further manage the discovered location and localized content to satisfy the users' privacy concerns.

Determining the location of a particular online (or network) user offers significant benefits, even if only on a gross level such as the user's country. With geographic location information, online sites benefit by targeting their services. For example, an online retail site may tailor its offerings based on the location of the user. In December, bathing suits are more suitable attire for Florida, while winter coats are more appropriate for Minnesota.

In addition, an online site may have to restrict its access to certain locales. Different encryption levels are allowed in the USA and Europe; therefore, e-commerce sites may choose to avoid transactions from countries with cumbersome regulations.

With geographic location information, an online site can customize its site based on the locale of the user, such as using country specific colors or icons. For example, the online site could feature the American flag and use the colors red, white, and blue for Internet visitors from the United States, and feature the Chinese flag and the color red for visitors from China. The online site can use the location of the user to implement location sensitive billing. For example, the online site may provide a discount if a mobile device makes a purchase at a specific location.

The management of location and localized content with regard to contract and privacy system of the present invention provides several features and advantages, among which are the following:

Simplicity: The system of the invention represents a single interface between online sites and locator sources.

Flexibility: The contract allows specification by the online site for the type of location information, accuracy, and time limitations.

Accuracy, Speed, and Extrapolation: The system of the invention maintains a location database that stores as an aggregate all the location information obtained from the location services. This database serves as a location cache and is also used to extrapolate the locations for unknown IP addresses. The system also maintains a locator sources accuracy database that stores information about all the location services, including their accuracy ratings with respect to particular IP addresses and geographic areas. Given a particular IP address, the system can target subsequent location requests to those location services likely to provide the most accurate result. Greater location accuracy translates to more focused content and advertising for its registered online sites.

Financial: The system of the invention requires payment only for satisfied contracts, as defined by the contract with the online site.

Privacy Protection: Online users are allowed to opt out of location detection by the system of the present invention, safeguarding their privacy.

Localization Data: The system of the present invention provides value-added localization data based on the resulting location of the IP address.

The above and further objects and features of the present invention are realized by a system and associated method for determining the network users' geographic or physical locations. The system includes a locator broker that interacts with various locator sources, online sites, and online users.

Existing locator sources perform the analysis to determine the geographical location of an IP address. The locator sources typically license their software on a subscription basis. Online sites such as retailers or Internet content providers register themselves as clients of the locator broker, allowing an online site to request location information from the locator broker for the IP address of a user connected to the online site. The locator broker returns the geographic location of the IP address. Online users connect directly to online sites for information gathering, e-commerce transactions, etc. The online site covets the location information of the online user's computer location. However, the online user may choose to remain anonymous.

The system further allows the online users to register with the locator broker for the express purpose of protecting their geographic locations. If the online users are registered with the locator broker, their geographic locations will not be forwarded to the online site. As an additional privacy safeguard, the locator broker does not indicate that the location information is being withheld, it just provides a "location not found" result. The locator broker provides this service to the online user free of charge. The process used by the locator broker to determine the physical locations of IP addresses can also be applied to any hierarchical network address such as the IP address or phone numbers, and to any hierarchical physical address such as county, state, city, etc. to the most granular level desired.

The locator broker is the intermediary between the locator sources and the online sites. The locator broker aggregates and validates the results from its location queries of the locator sources then returns to the online site the most likely location for a given IP address. The locator broker also tracks the reliability of each locator source and thus targets its location queries to those services most likely to provide an accurate result. The locator broker digests location data from multiple geolocation services and presents a coherent view of the location data to the online site.

The locator broker also provides value-added localization data to the online site based on the resulting location of the IP address. This localization data includes useful suggestions to the online site for tailoring data to the online user based on the user's physical location. This localization data may include colors or icons specific to a locale (such as red for China), languages, demographics, climate, etc. In addition to suggestions, the localization data can also provide privacy norms specific to a locale, such as avoiding race or gender.

The locator broker acts on a contract from the online site, which specifies the IP address for which a location is desired. The contract allows the online site to dictate the type of location desired (e.g., city, state), the accuracy desired, and the time frame in which the request must be satisfied. The locator broker bills the online site only when it satisfies the contract for time and accuracy.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

EXtensible Markup Language (XML): A standard, semi-structured language used for Web documents. During a document authoring stage, XML "tags" are embedded within the informational content of the document. These tags are not predefined and can be interpreted by different applications for different purposes, such as exchange of data, visual display. For example, when the web document (or "XML document") is subsequently transmitted by a web server to a web browser, the tags are interpreted by the browser and used to parse and display the document. In addition to specifying how the web browser is to display the document, XML tags can be used to create hyperlinks to other web documents.

Geolocation: The science of determining the physical location of a network user, such as an Internet or e-mail user.

Internet: A collection of interconnected public and private computer networks that are linked together with routers by a set of standards protocols to form a global, distributed network.

IP Address: (Internet Protocol address) The address of a computer attached to a TCP/IP network. Every client and server station must have a unique IP address. Client workstations have either a permanent address or one that is dynamically assigned to them at the start of each dial-up session. IP addresses are written as four sets of numbers separated by periods; for example, 204.171.64.2.

Online Site or Web Site: A database or other collection of inter-linked hypertext documents ("web documents" or "web pages") and associated data entities that is accessible via a computer network and that forms part of a larger, distributed informational system such as the WWW. In general, a web site corresponds to a particular Internet domain name and includes the content of a particular organization. Other types of web sites may include, for example, a hypertext database of a corporate "intranet" (i.e., an internal network that uses standard Internet protocols), or a site of a hypertext system that uses document retrieval protocols other than those of the WWW.

TCP/IP: (Transmission Control Protocol/Internet Protocol) A communications protocol developed to internetwork dissimilar systems. TCP provides transport functions, which ensures that the total amount of bytes sent is received correctly at the other end.

Tuple: a data object containing two or more components, also known as a pair, triple, quad, etc. Tuples of different sizes have different types, in contrast to lists where the type is independent of the length.

World Wide Web (WWW): An Internet client-server hypertext distributed information retrieval system.

Figure 1:
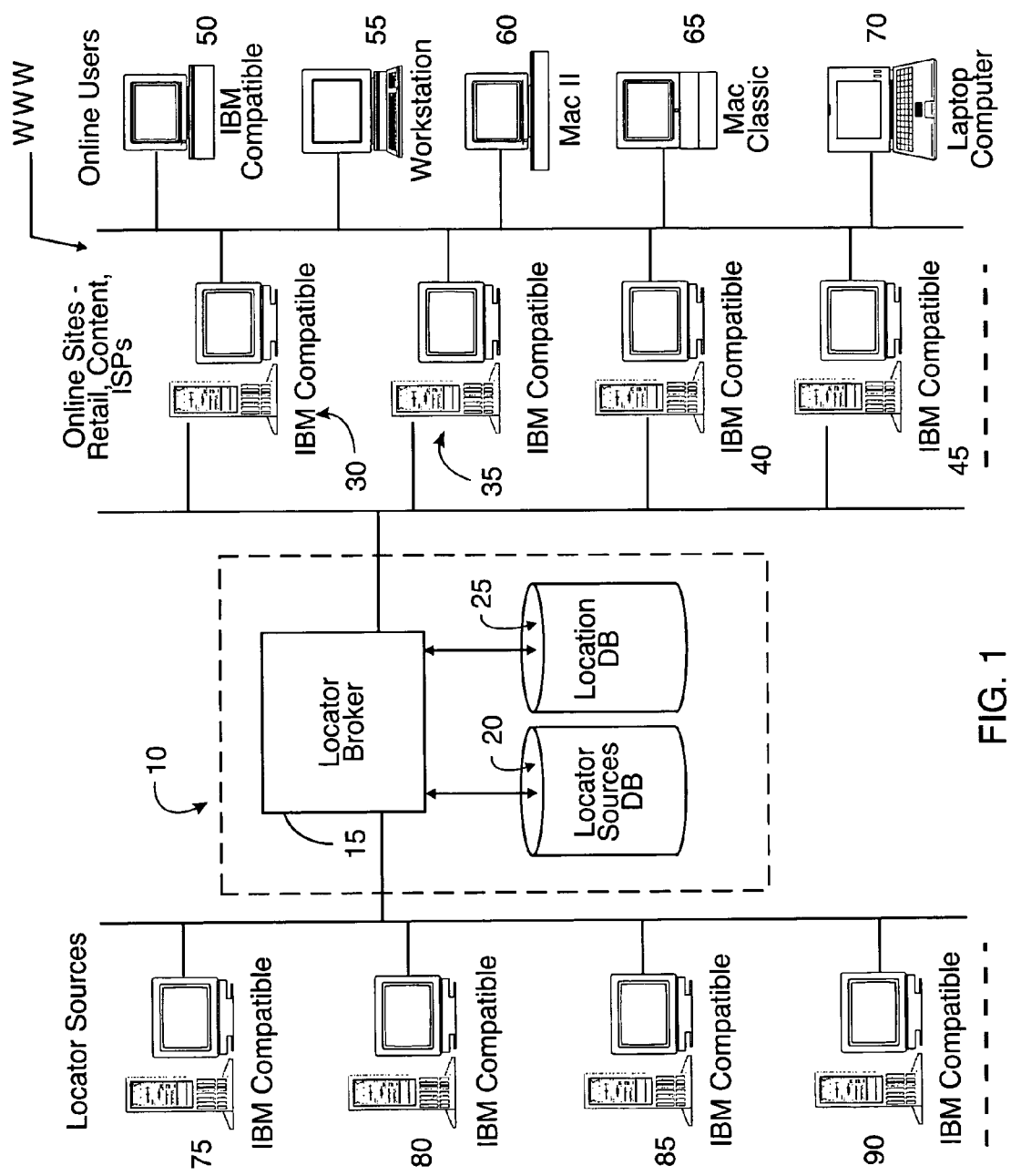
FIG. 1 is an illustration of an exemplary operating environment in which a location management system of the present invention can be used.

FIG. 1 portrays the overall environment in which a location management system 10 according to the present invention may be used. The system 10 includes a software or computer program product that is typically embedded within, or installed on a host server. Alternatively, the system 10 can be saved on a suitable storage medium such as a diskette, a CD, a hard drive, or like devices.

The system 10 includes a locator broker 15 and various databases represented by the locator sources database 20 and location database 25. The online sites represented by the reference numerals 30, 35, 40, and 45 contract with the locator broker 15 to provide the physical location of the IP addresses for online users represented by the reference numerals 50, 55, 60, 65, and 70.

In an exemplary operation, the online sites 30, 35, 40, and 45 are typically e-commerce retail or Internet content providers. As an example, an online user 50 accesses the online site 30 requesting information on a product. The online site 30 wishes to determine the physical or geographical location of the online user to target its advertising specifically to that user. The online site 30 contacts the locator broker 15 with the IP address of the online user 50. The locator broker 15 then queries some subset of the locator sources 75, 80, 85, and 90 for the geographic location of the IP address for the online user 50.

Online sites 30, 35, 40, and 45 register as clients of the locator broker 15. This registration allows an online site to request location information from the locator broker for a given IP address. The IP address would be that of a connecting user such as online user 50 to an online site such as online site 30. The locator broker 15 would return the geographic location of the IP address. The geographic location can vary, with location types of city, state, country, zip code, etc. The online site 30 could pay the system 10 per successful transaction, wherein the accuracy of the returned location satisfies the minimum requirements set by the contract of the request.

Online users 50, 55, 60, 65, and 70 connect directly to online sites 30, 35, 40, and 45 for information gathering, e-commerce transactions, etc. The visited online site 30, 35, 40, or 45 acquire the location of the online user's computer 50, 55, 60, 65, or 70. For example, the online user 50 visits online site 30. Online site 30 requests the location of the IP address for online user 50. However, the online user 50 may choose to remain anonymous. The locator broker 15 allows online user 50 to register with the locator broker 15 for the express purpose of protecting the user's geographic location. Even though locator source 75 may have discovered the geographical location of online user 50, the geographic location of online user 50 will not be forwarded to online site 30. As an additional privacy safeguard, the locator broker 15 does not indicate that the location information is being withheld, it just provides a neutral result, such as "location not found". The locator broker 15 provides this service to online user 50 free of charge.

Locator sources 75, 80, 85, and 90, perform the analysis that determine the geographical location of an IP address. These locator sources typically license their software on a subscription basis.

Figure 2:
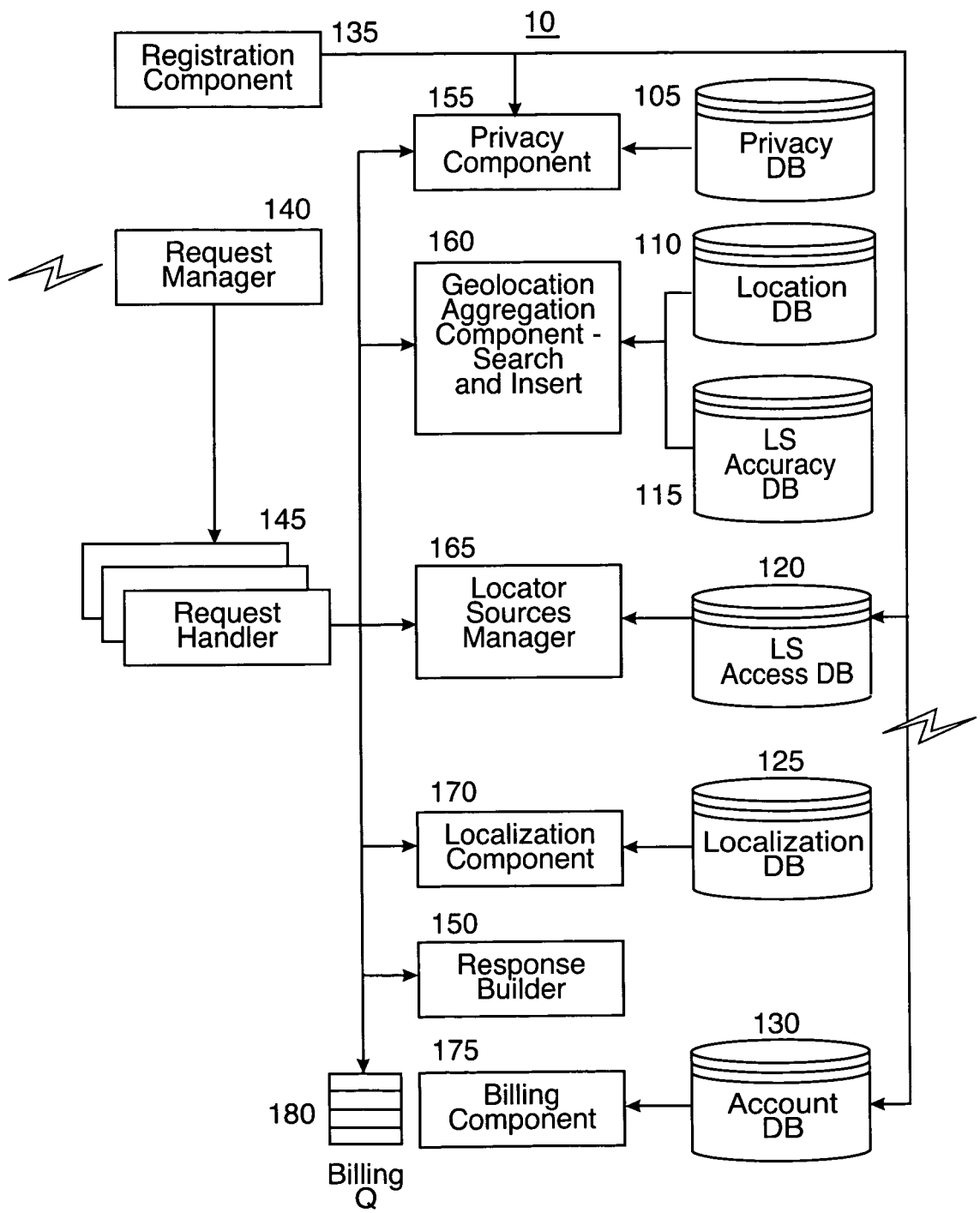
FIG. 2 is a block diagram that illustrates a high level architecture of the location management system of FIG. 1.

FIG. 2 illustrates a high level architecture of the system 10 and the locator broker 15 where the term locator source is abbreviated as "LS" and the term database is abbreviated "DB". The locator broker 15 maintains and accesses the following data sources: a privacy database 105, a location database 110, a locator sources accuracy database 115, a locator sources access database 120, a localization database 125, and an account database 130.

The privacy database 105 contains the IP addresses of those computers that have requested their physical location information, if known, be withheld. An entry is created in this database each time an online user "registers" a computer. Note that more than one computer can be registered for a user. No user information is maintained in the privacy database 105, just IP addresses.

The location database 110 contains known IP addresses with associated locations such as city, state, country, zip code, etc. In addition, the probabilities of accuracy for each location component of the IP address are stored with the IP address. The locator sources database 115 contains accuracy information on the locations returned from IP address queries by the locator broker 15. The locator sources access database 120 contains information on the protocol required to access each locator source such as locator sources 75, 80, 85, or 90 of FIG. 1. Examples of a protocol used by locator sources 75, 80, 85, and 90, are SOAP service call, HTTP request, etc.

The localization database 125 contains static information relevant to particular locales such as language, demographics, associated colors or icons, and climate. The account database 130 contains account information for registered online sites such as online sites 30, 35, 40, and 45 of FIG. 1. It also contains account information for the locator sources such as locator sources 75, 80, 85, and 90 employed by the locator broker 15 to provide location information for IP addresses.

The locator broker 15 includes the registration component 135, the request manager 140, the request handler 145, the response builder 150, the privacy component 155, the geolocation aggregation component 160, the locator sources manager 165, the localization component 170, and the billing component 175.

The registration component (or engine) 135 records the registration of online users such as online users 50 through 70 of FIG. 1 and online sites such as online sites 30 through 45 of FIG. 1. Online users register so that the locator broker 15 will keep the physical location associated with the IP address of their computer withheld. The registration process involves an online user 50 entering their IP address onto a form (e.g., via the WWW) of the locator broker 15. The registration component 135 then creates an entry in the privacy database 105 for the registered IP address.

Online sites also register so that the locator broker will provide location information associated with a given IP address. The registration process involves an online site such as online site 30 agreeing to the policies of the locator broker 15 and entering its account and billing information onto a form (e.g., via the WWW) of the locator broker 15. The registration component 135 then creates an entry in the account database 130 for the online site 30.

Additionally, locator sources such as locator sources 75 through 90 of FIG. 1 can be registered as sources of location information for the locator broker 15. Locator sources can provide location information on a transaction basis or by licensing their software on a subscription basis. A locator broker account representative (i.e., a person), upon agreeing to the terms presented by the locator source, requests the registration component 135 to enter the details of the arrangement in the account database 130.

The request manager 140 processes incoming location information requests from an online site such as online sites 30 through 45 of FIG. 1. The request manager 140 initiates a separate process called a request handler 145 for each request. There is one request handler 145 for each request from an online site; each request is represented as a contract. The contract contains the following data:

a) IP address to be converted to a physical location;

b) request list, comprised of the following tuples of:

b.1) the type of location desired (e.g., city, state, country), b.2) the radius, representing a buffer zone around a location type, b.3) the unit of measure for the radius, and b.4) the minimum accuracy of success, given the respective location desired; and c) time frame in which the request must be satisfied.

If more than one location type satisfy the request, item (b) of the contract can be specified for each type. For example, online site 30 requests the city associated with IP address 9.1.19.35 with 80% accuracy or the state associated with the IP address with 90% accuracy. The contract can be represented, for example, as an XML document, as indicated below.

```
<contract>
    <ipaddr>9.1.19.35</ipaddr>
    <request_list>
        <request type="city" radius="10" units="mile" accuracy=
        "80%" />
        <request type="state" radius="50" units="mile" accuracy=
        "90%" />
        <request type="timezone" radius="1" units="mile" accuracy=
        "70%" />
    <request_list>
    <timeframe value="3" units="ms" />
</contract>
```

The only contract field required is the IP address. If no location (item b.1) is specified, the locator broker 15 will return the best possible location, which is not necessarily the same as the one with the narrowest scope. For example, if it is determined with 100% confidence that the requested IP address is within the state of California, and with 20% confidence that the city is San Jose, the locator broker 15 will return the result of California with 100% accuracy. If no minimum accuracy of success (item b.4) is specified, again, the locator broker 15 will return the best possible location. If no time frame is specified, the locator broker 15 is not limited by time. However, if a time frame is specified, the request handler 145 will ensure that a response is returned to online site 30 within the specified time, even though the response may be unsuccessful.

The response builder 150 prepares a location response to the originating online site such as online site 30 in response to the contract request put forth by online site 30.

This response contains the following data:

a) IP address which was to be converted to a physical location;

b) result list, if contract was satisfied;
    b.1) result list, comprised of tuples of:
    b.1.a) radius/accuracy of report,
    b.1.b) accuracy that the user is indeed at this location, and
    b.1.c) physical location report in one of the known formats (e.g., city, state, country, zip/postal code, time zone); and c) reason code (e.g., location found, location not available, time expired, etc.).

The following XML document is an example of a successful response, i.e., one that satisfied the contract:

```
<report>
    <ipaddr>9.1.19.35</ipaddr>
    <result_list>
        <result radius="10" units="mile" accuracy="85%">
            <location type="city" city=
            "San Jose" state="California" country="United States" />
        </result>
        <result radius="10" units="mile" accuracy=
        "15%">
            <location type="city" city="Santa Clara" state=
            "California" country="United States" />
        </result>
        <result radius="0" units="mile" accuracy=
        "100%">
            <location type="state" state="California" country=
            "United States" />
        </result>
        <result radius="50" units="mile" accuracy=
        "90%" />
```

-continued

```
        <location type="timezone" timezone="PST" />
      </result>
   </result_list>
   <reason_code>location found</reason_code>
</report>
```

An unsuccessful response or contract that could not be satisfied is illustrated by the following XML document:

```
<report>
   <ipaddr>9.1.19.35</ipaddr>
   <reason_code>location not available</reason_code>
</report>
```

The privacy component 155 is responsible for ensuring that location information is withheld for IP addresses that are registered with the locator broker 15. Input to the privacy component 155 is the IP address. The privacy component 155 uses the address as an index into the privacy database 105. If an entry for that IP address is found in the privacy database 105, the privacy component 155 returns the Boolean true, indicating that the location is to be withheld, otherwise false is returned.

The geolocation aggregation component 160 has two interfaces: one for inserting location data from geolocation services and the other for querying the mapping from IP address to physical address. The target of the mapping can also be an approximation of a physical location such as a zip code or time zone. The geolocation aggregation component 160 applies artificial intelligence techniques to discover the mappings. The process improves the quality of location data and presents a coherent view of location data.

The interface between the locator broker 15 and the search function of the geolocation aggregation component 160 is an augmented contract. The request contains the following data:

a) IP address to be converted to a physical location;
b) request list, comprised of tuples of:
   b.1) type of location desired (e.g., city, state, country),
   b.2) radius, representing a buffer zone around a location type,
   b.3) unit of measure for the radius, and
   b.4) minimum accuracy of success, given the respective location desired; and
c) flag indicating whether a source list should be generated (true, if source list should be generated; false, if source list should not be generated).

The response contains the following data:

a) IP address to be converted to a physical location;
b) result list, if contract was satisfied; or source list, if contract was not satisfied and source list generation was requested:
   b.1) result list, comprised of tuples of
      b.1.a) radius/accuracy of report,
      b.1.b) accuracy that the user is indeed at this location, and
      b.1.c) physical location report in one of the known formats (e.g., city, state, country, zip/postal code, time zone); or
   b.2) source list, comprised of the identifier of the locator source(s) most likely to satisfy the contract.

The following XML document is an example of a successful response, i.e., one that satisfied the contract:

```
<report>
   <ipaddr>9.1.19.35</ipaddr>
   <result_list>
      <result radius="10" units="mile" accuracy="85%">
         <location type="city" city="San Jose" state=
         "California" country="United States" />
      </result>
      <result radius="10" units="mile" accuracy="15%">
         <location type="city" city="Santa Clara" state=
         "California" country="United States" />
      </result>
      <result radius="0" units="mile" accuracy="100%">
         <location type="state" state="California" country=
         "United States" />
      </result>
      <result radius="50" units="mile" accuracy="90%" />
         <location type="timezone" timezone="PST" />
      </result>
   </result_list>
   <source_list/>
</report>
```

An unsuccessful response or contract that could not be satisfied is illustrated by the following XML document:

```
<report>
   <ipaddr>9.1.19.35</ipaddr>
   <source_list>
      <source name="NAME" />
      <source name="Digital Envoy" />
   </source_list>
   <result_list/>
</report>
```

The geolocation aggregation component 160 provides two methods that the location broker 15 uses to store and retrieve geolocation data. The insert method takes as its input parameter a 6-tuple (S, NA, T, PA, R, U) and has no output parameters. S is the name of the locator source, NA is a hierarchical network address such as an Internet Protocol (IP) address, PA is a hierarchical physical address such as a country/state/city triplet, and T indicates the type of PA (e.g. city, state, and/or time zone). The radius is R and U is the unit of measure such as miles or kilometers; R and U together represent an estimated accuracy of PA. For instance, R=10 and U=miles would represent a 10-mile radius around the physical location indicated by PA. An example of the 6-tuple is:

("NAME", "9.1.19.35", "city", "USA/California/San Jose", 10, "mile")

The input parameter of the search method is a contract C that is most conveniently expressed as an XML document:

```
<contract>
   <ipaddr>9.1.19.35</ipaddr>
   <request_list>
      <request type="city" radius="10" units="mile" accuracy=
      "80%" />
      <request type="state" radius="50" units="mile" accuracy=
      "90%" />
      <request type="timezone" radius="1" units="mile" accuracy=
      "70%" />
   <request_list>
   <timeframe value="3" units="ms" />
</contract>
```

The output parameter of the search method is a report that maps a network address to physical addresses. The report is also expressed as an XML document:

```
<report>
    <ipaddr>9.1.19.35</ipaddr>
    <result_list>
        <result radius="10" units="mile" accuracy="85%">
            <location type="city" city="San Jose" state=
            "California" country="United States" />
        </result>
        <result radius="10" units="mile" accuracy="15%">
            <location type="city" city="Santa Clara" state=
            "California" country="United States" />
        </result>
        <result radius="0" units="mile" accuracy="100%">
            <location type="state" state="California" country=
            "United States" />
        </result>
        <result radius="50" units="mile" accuracy="90%" />
            <location type="timezone" timezone="PST" />
        </result>
    </result_list>
    <source_list/>
</report>
```

The locator broker 15 may on occasion issue a search request for a NA that does not exist or hasn't yet been encountered by the geolocation aggregation component 160. In addition to returning an empty list of potential physical locations to the locator broker 15, the geolocation aggregation component 160 returns a list of locator source names from which the locator broker 15 should contact and retrieve geolocation data. The locator broker 15 then inserts the data into the geolocation aggregation component 160 so that future requests for the same NA can be completed by the geolocation aggregation component 160 without forwarding to locator sources.

The following functions are used to describe the design and performance of the geolocation aggregation component 160: D(A), C(N), V(A,N) and SI. The function D(A) indicates the dimensionality of an address A (NA or PA). This value tells how many dimensions (hierarchy levels) the address has. For instance, the dimensionality of an Internet Protocol (IP) address of the form "9.1.29.202" is 4. The dimensionality of a country/state/city address is 3, and for zip codes and time zones it is 1.

The function C(N) returns the cardinality (number of distinct values) of network addresses in the nth dimension and all greater dimensions. For instance, IP addresses have the following values: C(4)=256, C(3)=256*C(4), C(2)=256*C(3), and C(1)=256*C(2).

The function V(A, N) returns the value of A in the nth dimension, or the nth component of the address A. It is assumed that $1 \leq N \leq D(A)$. For instance, V(9.1.29.202, 3) is 29 and the value of V(United States/California/San Jose, 2) is California.

A spatial index SI is defined for each distinct physical address type T (country/state/city, country/state, country, ZIP, and time zone). D(SI) is the dimensionality of the physical address type for which the index was defined. For example, the spatial index SI for the physical address type "country/state/city" has a D(SI) value of 3.

In a spatial index SI of type T, network address NA is used as the index key and is associated with a list of 4-tuples (PA, R, U, set(S)). As described earlier, PA is a physical address, R is a radius, and U is a unit of measure. Set(S) is a set of locator source names S for which a tuple (S, NA, T, PA, R, U) has been inserted into the geolocation aggregation component 160.

A preferred data structure for the spatial index is a k-d tree (k-dimensional tree), a well-known spatial indexing method. Several variations of the k-d tree data structure exist, the differences being the manner in which comparisons are performed in each tree node. The two most common variations are rotating the dimension number used in the comparison at each tree level (round-robin fashion) and choosing the most discriminating dimension independently at each tree level.

The geolocation aggregation component 160 uses a k-d tree spatial index constructed in the following manner. To insert a 6-tuple (S, NA, T, PA, R, U) into a spatial index SI of type T and dimensionality D(SI), the dimensionality of PA is first reduced to match the dimensionality of SI, where TPA is the first D(SI) dimension of PA.

Interior nodes (decision nodes) of the spatial index are constructed by using V(NA, N) as the index value, where $1 \leq N \leq D(NA)$. The tree is first built by using V(NA, 1) as the index value. Leaf nodes are then further split into subtrees by using V(NA, 2) as the index value. The resulting leaf nodes are split by using V(NA, 3), and so on, until there is only one NA that matches the path from the root of the tree to a leaf node (i.e. each distinct NA is stored in a separate leaf node), or N=D(NA) is reached.

In each interior node we also store the number of tuples SUM that exist in its subtree. In other words, SUM is the sum of the sizes of set(S) in the leaf nodes of the subtree. A leaf node contains the NA value and a list of 4-tuples (TPA, R, U, set(S)). We define the 3-tuple (TPA, R, U) to be the primary key of the tuple.

Figure 3:
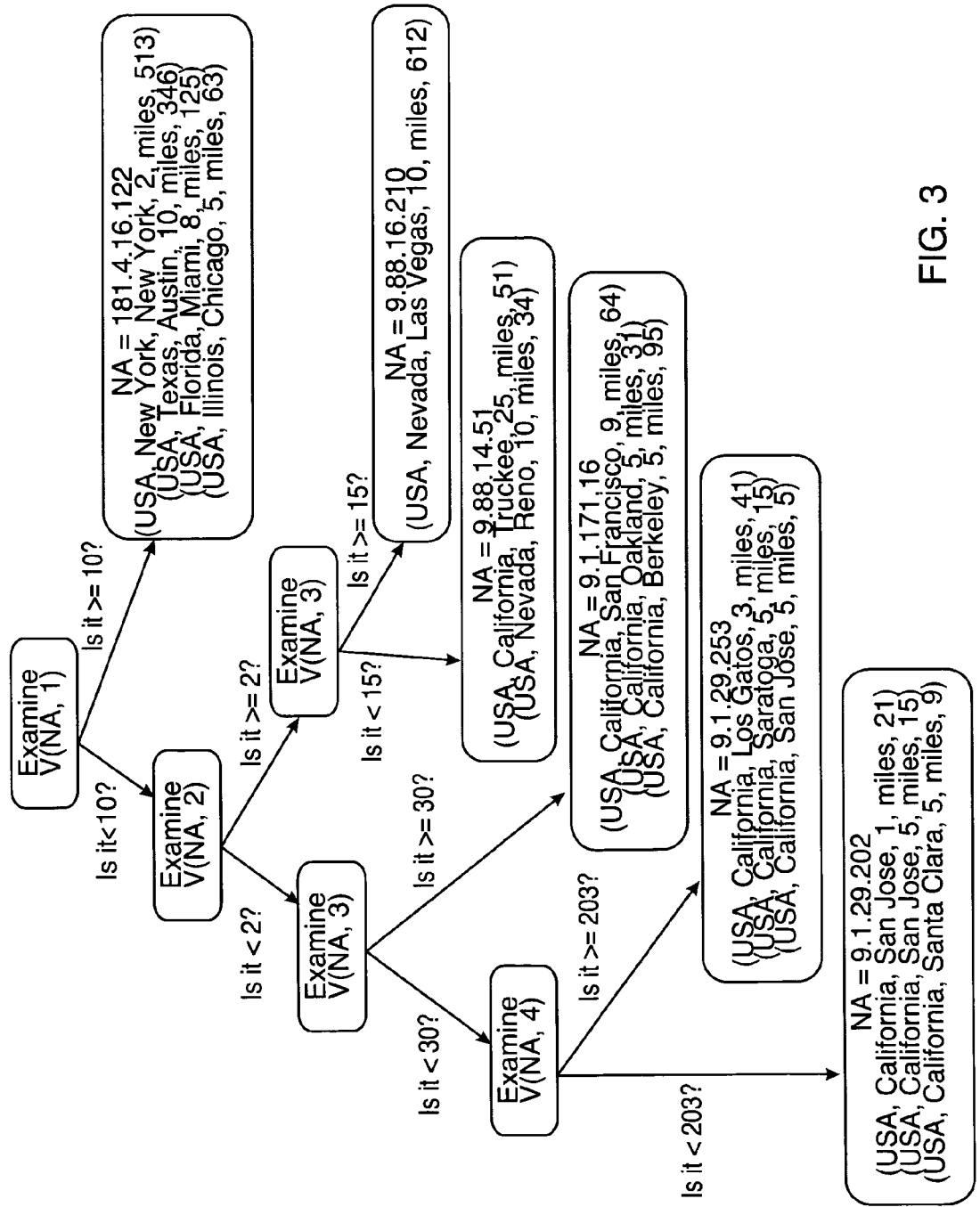
FIG. 3 represents a spatial index for an exemplary physical address type "Country/State/City," as implemented by the location management system of FIG. 2.
Figure 4:
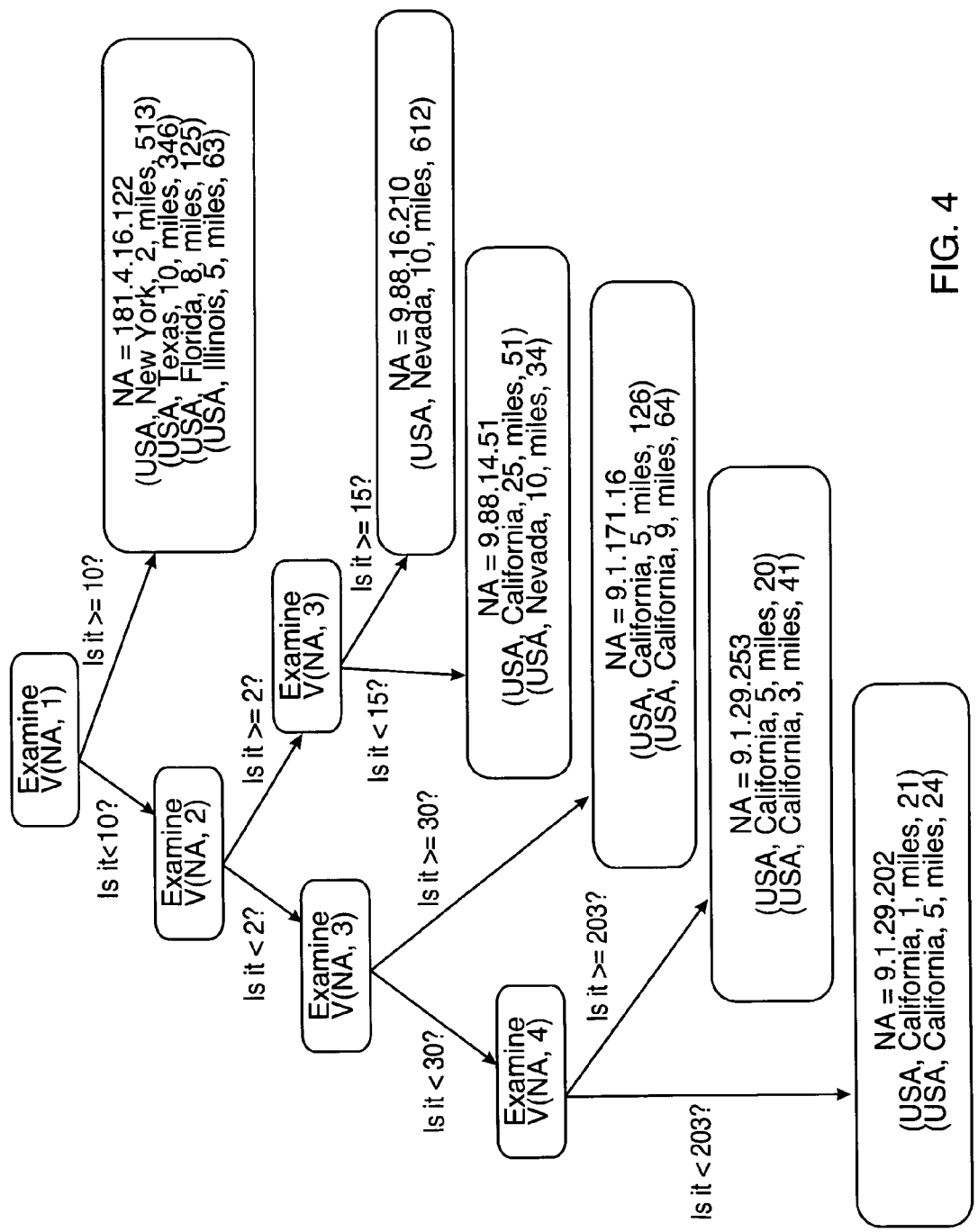
FIG. 4 represents a spatial index for an exemplary physical address type "Country/State," as implemented by the location management system of FIG. 2.
Figure 5:
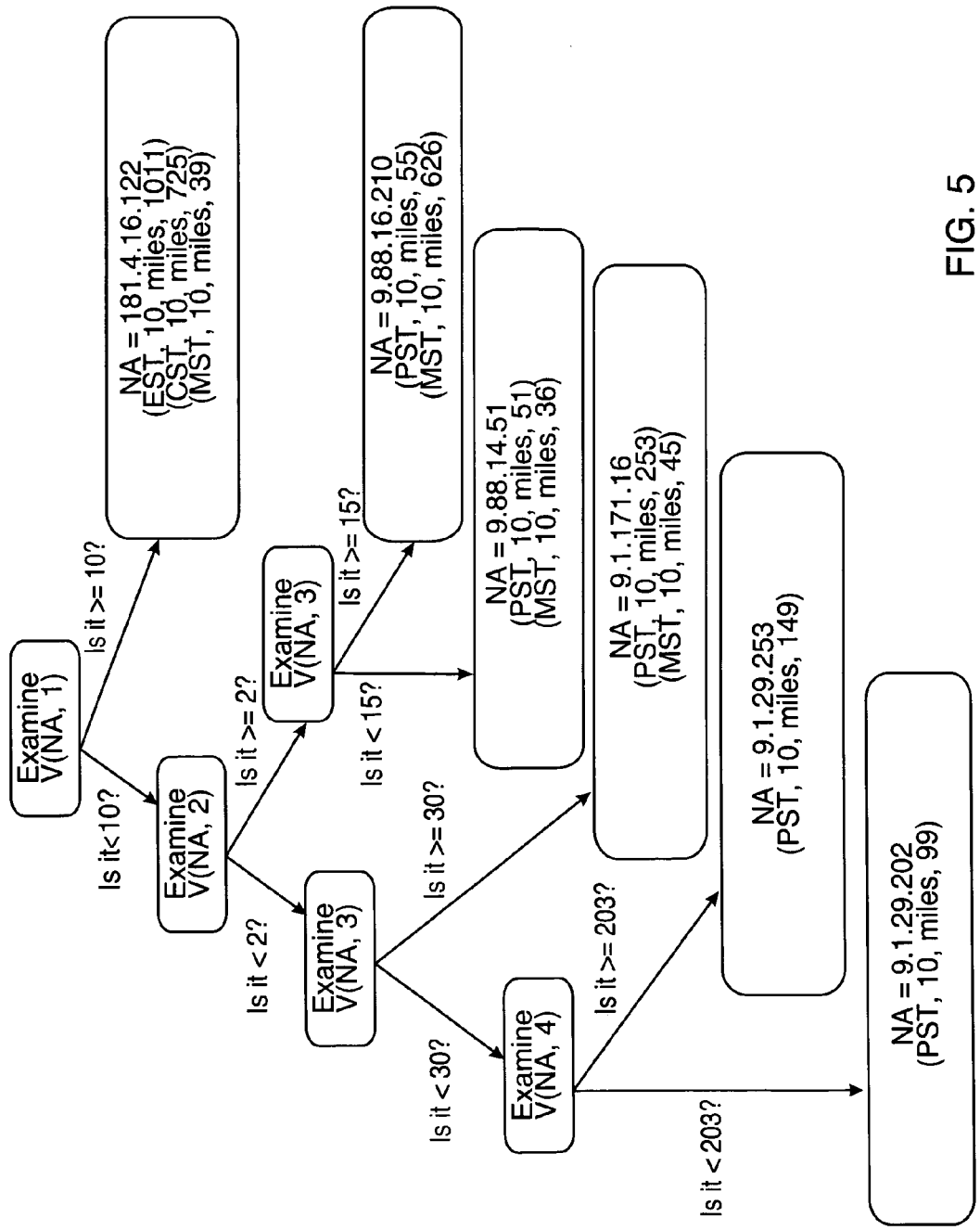
FIG. 5 represents a spatial index for an exemplary physical address type "Time Zone," as implemented by the location management system of FIG. 2.

FIGS. 3, 4, and 5 illustrate spatial indices constructed from the following list of location data:

NA 9.1.29.202, T=city, PA United States/California/San Jose, R=1, U=mile (21 Sources)

NA=9.1.29.202, T=city, PA=United States/California/San Jose, R=5, U=mile (15 Sources)

NA=9.1.29.202, T=city, PA=United States/California/Santa Clara, R=5, U=mile (9 Sources)

NA=9.1.29.202, T=timezone, PA=Timezone/PST, R=10, U=mile (99 Sources)

NA=9.1.29.253, T=city, PA=United States/California/Los Gatos, R=3, U=mile (41 Sources)

NA=9.1.29.253, T=city, PA=United States/California/Saratoga, R=5, U=mile (15 Sources)

NA=9.1.29.253, T=city, PA United States/California/San Jose, R=5, U=mile (5 Sources)

NA=9.1.29.253, T=timezone, PA=Timezone/PST, R=10, U=mile (149 Sources)

NA=9.1.171.16, T=city, PA=United States/California/San Francisco, R=9, U=mile (64 Sources)

NA=9.1.171.16, T=city, PA=United States/California/Oakland, R=5, U=mile (31 Sources)

NA=9.1.171.16, T=city, PA=United States/California/Berkeley, R=5, U=mile (95 Sources)

NA=9.1.171.16, T=timezone, PA=Timezone/PST, R=10, U=mile (253 Sources)

NA=9.1.171.16, T=timezone, PA=Timezone/MST, R=10, U=mile (45 Sources)

NA=9.88.14.51, T=city, PA=United States/California/Truckee, R=25, U=mile (51 Sources)

NA=9.88.14.51, T=city, PA=United States/Nevada/Reno, R=10, U=mile (34 Sources)

NA=9.88.14.51, T=timezone, PA=Timezone/PST, R=10, U=mile (51 Sources)

NA=9.88.14.51, T=timezone, PA=Timezone/MST, R=10, U=mile (36 Sources)

NA=9.88.16.210, T=city, PA=United States/Nevada/Las Vegas, R=10, U=mile (612 Sources)

NA=9.88.16.210, T=timezone, PA=Timezone/PST, R=10, U=mile (65 Sources)

NA=9.88.16.210, T=timezone, PA=Timezone/MST, R=10, U=mile (626 Sources)

NA=181.4.16.122, T=city, PA=United States/New York/New York, R=2, U=mile (513 Sources)

NA=181.4.16.122, T=city, PA=United States/Texas/Austin, R=10, U=mile (346 Sources)

NA=181.4.16.122, T=city, PA=United States/Florida/Miami, R=8, U=mile (125 Sources)

NA=181.4.16.122, T=city, PA=United States/Illinois/Chicago, R=5, U=mile (63 Sources)

NA=181.4.16.122, T=timezone, PA=Timezone/EST, R=10, U=mile (1011 Sources)

NA=181.4.16.122, T=timezone, PA=Timezone/CST, R=10, U=mile (725 Sources)

NA=181.4.16.122, T=timezone, PA=Timezone/MST, R=10, U=mile (39 Sources)

FIG. 3 shows the spatial index for the country/state/city physical address type. The tree maps the IP address 9.1.29.202 to San Jose, Calif. with 80% accuracy and to Santa Clara, Calif. with 20% accuracy. Several other mappings are also shown in the index.

FIG. 4 shows the spatial index for the country/state physical address type. Note that some of the physical address tuples of the tree in FIG. 3 indicated in bold text have been collapsed into a single physical address tuple since the original tuples share the same country/state information. Tuples with distinct R and U values remain separate.

FIG. 5 shows the spatial index for the time zone physical address type. Note that the number of tuples in each leaf node is different in FIG. 5 as compared to FIGS. 3 and 4. This is because some locator sources may provide only time zone information; in addition, the information may be inconsistent with the country/state/city information received from other locator sources.

As discussed earlier, the geolocation aggregation component 160 uses two methods to store and retrieve geolocation data: the insert method and the search method.

Referring back to FIG. 2 and the architecture of the locator broker 15, the locator sources manager 165 is responsible for querying the external locator sources such as locator sources 75 through 90 of FIG. 1 to discover the location associated with an address. An output from the geolocation aggregation component 160 is a list of locator sources most likely to satisfy a particular request. The locator sources manager 165 sends a query request to those designated locator sources. The locator sources manager 165 utilizes the locator sources access database 120 for access protocols required by the specific locator source such as SOAP service call, HTTP request, etc.

The localization component 170 accesses the localization database 125 to obtain information related to the location found for the IP address. The billing component 175 is responsible for billing the online site such as online sites 30 through 45 of FIG. 1 for a satisfied contract and, if necessary, recording the costs associated with using the locator sources.

Figure 6:
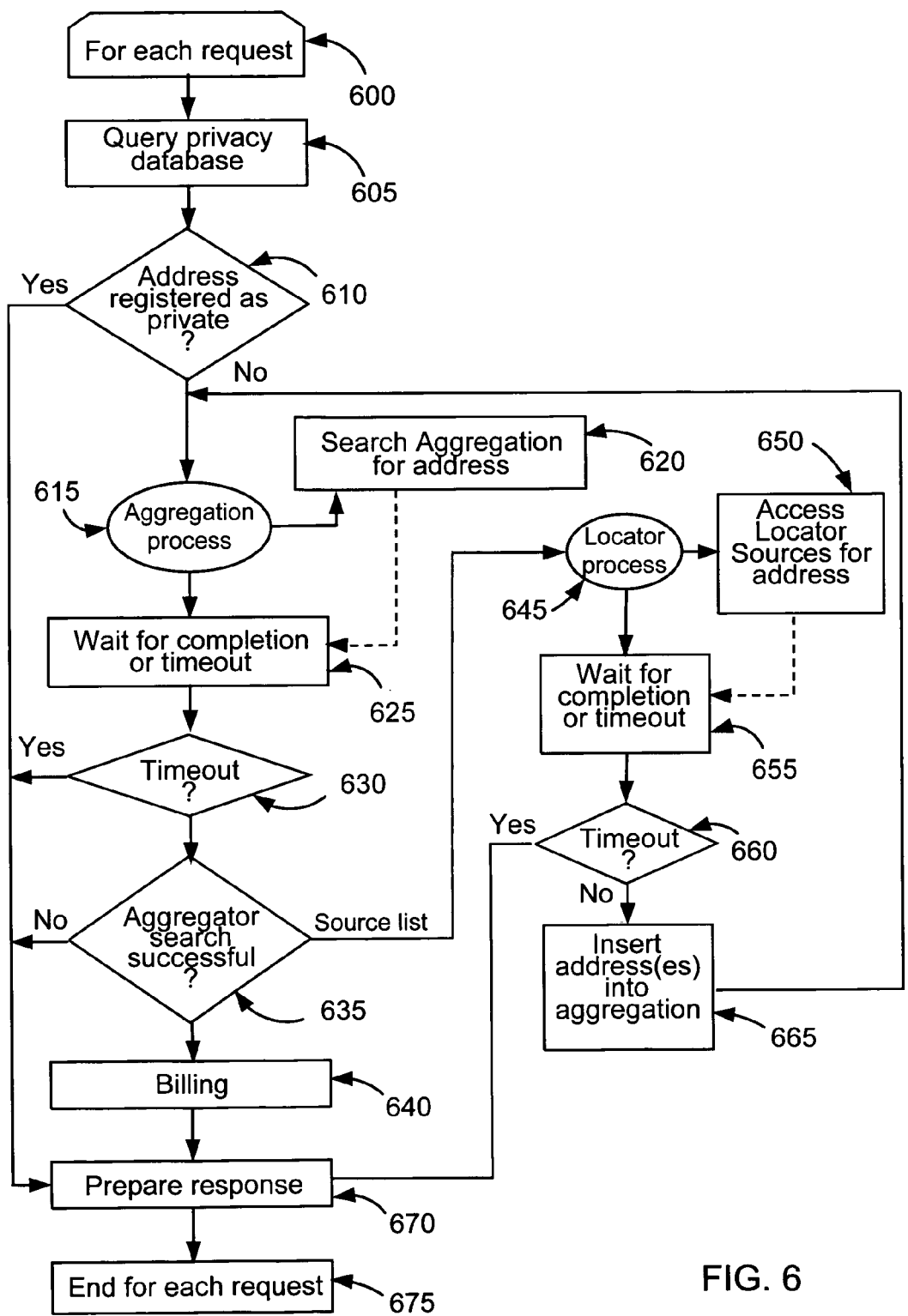
FIG. 6 is a flow chart that illustrates a method of operating the location management system of FIG. 2.

In operation, and with further reference to FIG. 6, the request manager 140 is waiting on incoming requests from online sites in step 600. For each online site request, the request manager 140 initiates a separate process by request handler 145 in step 605. The request handler 145 coordinates all the activities necessary to satisfy the request. If the online site such as online site 30 of FIG. 1 requires the request be satisfied within a particular time frame, the request handler 145 monitors the time remaining for the actions to satisfy the request. If necessary, the request handler 145 sends back a "time expired" response if the time expires.

On entry to the request handler 145, if there is insufficient time to process the request the request handler 145 immediately calls the response builder 150 to prepare a "time expired" response. The response is returned to online site 30 and the request handler 145 exits.

If time allows, or otherwise if there is no time limit, the request handler 145 calls the privacy component 155. The Privacy component 155 accesses the privacy database 105 in step 605 to determine if the IP address within the request is registered as private. Two paths are possible at step 610, based on whether the IP address is found in the privacy database 105.

An address registered as private requires no additional processing, therefore the request handler 145 calls the response builder 150 to prepare a "location not available" response in step 670. The response is returned to online site 30 and the request handler 145 exits in step 675.

An address that is not found in the privacy database 105 is not registered, requiring additional processing in step 615 to determine its physical location. The request handler 145 initiates a separate aggregation process in step 620, which, in turn, invokes the search function call within the geolocation aggregation component 160. The input parameters to the search function are the contract and a flag to indicate that a source list of locator sources is desired if the geolocation aggregation component 160 can not satisfy the request.

The request handler 145 "waits" in step 625 for either the geolocation aggregation component 160 to complete the search or the timeout to expire. If the geolocation aggregation component 160 can not complete its task prior to the timeout, the request handler 145 calls the response builder 150 in step 630 to prepare a "time expired" response in step 670. The response is returned to online site 30 and the request handler 145 exits in step 675.

If the geolocation aggregation component 160 completes its location determination task before timeout and satisfies the contract, the request handler 145 calls the response builder 150 in step 635 to prepare a response with the location data found. The request handler 145 adds an entry to the billing queue 180, which is subsequently processed by the billing component 175 in step 640. The location data response is returned to online site 30 in step 670 and the request handler 145 exits in step 675.

If the geolocation aggregation component 160 completes its task before timeout in step 630, but did not satisfy the contract in step 635, it returns (if requested by the contract) a source list of locator sources most likely to satisfy the request. If a source list of locator sources was not returned from the geolocation aggregation component 160 then the aggregator search was unsuccessful in step 635 and the request handler 145 calls the response builder 150 to prepare a "location not available" response in step 670. The response is returned to online site 30 and the request handler 145 exits in step 675.

If a source list of locator sources was returned from the geolocation aggregation component 160 in step 635, the request handler 145 initiates a separate locator process in step 645, which in turn invokes the locator sources manager 165 to access each designated external locator source in step 650. The request handler 145 "waits" in step 655 for either the accesses to complete or the timeout to expire.

If the locator broker 15 cannot complete its task prior to the timeout, the request handler 145 calls the response builder 150 in step 660 to prepare a "time expired" response. The response is returned to the online site 30 in step 670 and the request handler 145 exits in step 675.

If the locator broker 15 completes its task before timeout occurs, the request handler 145 invokes in step 665 the insert function call within the geolocation aggregation component 160, which updates its databases with the location data returned from the location sources manager 165. With new data from the location sources manager 165, the request handler 145 again initiates a separate aggregation process in step 615, which in turn invokes in step 620 the search function call within the geolocation aggregation component 160. The input parameters to the search are the contract and a flag to indicate that a source list of locator sources is not desired if the geolocation aggregation component 160 cannot satisfy the request. The request handler 145 "waits" in step 625 for either the search to complete or the timeout to expire.

It is to be understood that the specific embodiments of the invention that have been described are merely illustrative of certain application of the principle of the present invention. Numerous modifications may be made to the location management system and associated method described herein without departing from the spirit and scope of the present invention. Moreover, while the present invention is described for illustration purpose only, in relation to the WWW, it should be clear that the invention may be applicable as well to any hierarchical network address such as the IP address or phone numbers and to any hierarchical physical address such as county, state, city, and so forth.

What is claimed is:

1. A processor-implemented method for managing an interface between a site wishing to discover a physical location of a network user and a locator broker that maintains a user's privacy preference, comprising:
the locator broker acquiring the user's physical location from at least one locator source;
determining if the user is registered with the locator broker;
if the user is registered, checking the user's privacy preference;
selectively releasing the user's physical location to the site based on the user's privacy preference;
wherein if the user is not registered with the locator broker, automatically releasing the user's physical location to the site;
wherein if the user is registered with the locator broker, automatically withholding the user's physical location from the site; and
the locator broker mapping addresses in a hierarchical network to hierarchical physical addresses.

2. The method of claim 1, wherein the locator broker acts as an intermediary between a plurality of locator sources and a plurality of sites wishing to discover the physical location of the network user.

3. The method of claim 2, further including the locator broker querying the plurality of locator sources about the user's physical location; and
the locator broker aggregating and validating query results about the user's physical location from the plurality of locator sources.

4. The method of claim 3, further including the locator broker selectively returning to the site a most likely physical location of the user.

5. The method of claim 3, further including the locator broker tracking a reliability of each locator source.

6. The method of claim 1, wherein mapping addresses includes mapping to a desired level of granularity.

7. The method of claim 1, wherein mapping addresses includes mapping any of internet addresses or telephone numbers.

8. The method of claim 1, wherein mapping addresses includes mapping hierarchical physical addresses to a desired granular level.

9. A processor-implemented system for managing an interface between a site wishing to discover a physical location of a network user and a locator broker that maintains a user's privacy preference, comprising:
the locator broker that acquires the user's physical location from at least one locator source and that includes a privacy component;
the privacy component determines if the user is registered with the locator broker;
a response builder that prepares a location response to the site in response to a query from the site for the user's physical address, and that selectively releases the user's physical location to the site based on the user's privacy preference;
wherein if the user is not registered with the locator broker, the response builder automatically releases the user's physical location to the site;
wherein if the user is registered with the locator broker, the response builder automatically withholds the user's physical location from the site; and
wherein the locator broker maps addresses in a hierarchical network to hierarchical physical addresses.

10. The system of claim 9, wherein the locator broker acts as an intermediary between a plurality of locator sources and a plurality of sites wishing to discover the physical location of the network user.

11. The system of claim 10, wherein the locator broker includes a locator sources manager that queries the plurality of locator sources about the user's physical location to discover the physical location associated with a user's network address.

12. The system of claim 11, wherein the locator broker further includes a geolocation aggregation component that aggregates and validates query results about the user's physical location from the plurality of locator sources.

13. The system of claim 12, wherein the locator broker further includes a localization component that accesses a localization database to obtain information related to the user's physical location found for the user's network address.

14. The system of claim 13, wherein the locator broker further includes a billing component that bills the site for a satisfied query.

15. The system of claim 9, wherein the addresses in the hierarchical network include any of internet addresses or telephone numbers.

16. The system of claim 9, wherein the information related to the user's physical location includes information about physical addresses and network addresses of other users with substantially matching network addresses to the user's network address.

17. A computer program product having a plurality of executable program codes stored on a computer-useable medium for managing an interface between a site wishing to discover a physical location of a network user and a locator broker that maintains a user's privacy preference, comprising:

the locator broker acquiring the user's physical location from at least one locator source;

a privacy program code for determining if the user is registered with the locator broker;

a response program code for preparing a location response to the site in response to a query from the site for the user's physical address, and for selectively releasing the user's physical location to the site based on the user's privacy preference;

wherein if the user is not registered with the locator broker program code, the response means automatically releases the user's physical location to the site; and wherein if the user is registered with the locator broker, the response means automatically withholds the user's physical location from the site; and wherein the locator broker maps addresses in a hierarchical network to hierarchical physical addresses.

18. The computer program product of claim 17, wherein the locator broker program code acts as an intermediary between a plurality of locator sources and a plurality of sites wishing to discover the physical location of the network user.

19. The computer program product of claim 18, wherein the locator broker program code includes a locator sources manager that queries the plurality of locator sources about the user's physical location to discover the physical location associated with a user's network address.

20. The computer program product of claim 19, wherein the locator broker program code further includes a geolocation aggregation means that aggregates and validates query results about the user's physical location from the plurality of locator sources.

21. The computer program product of claim 20, wherein the locator broker program code further includes a localization means that accesses a localization database to obtain information related to the user's physical location found for the user's network address.

22. The computer program product of claim 21, wherein the locator broker program code further includes a billing means that bills the site for a satisfied query.

23. The computer program product of claim 17, wherein the addresses in the hierarchical network include any of internet addresses or telephone numbers.

24. The computer program product of claim 21, wherein the information related to the user's physical location includes information about physical addresses and network addresses of other users with substantially matching network addresses to the user's network address.

\* \* \* \* \*